Dec. 19, 1967 R. L. WATTERS 3,359,489
PHOTOMULTIPLIER APPARATUS FOR DETERMINING THE TRANSIENT
RESPONSE OF LOGARITHMIC ELECTROMETERS
Filed Nov. 2, 1964
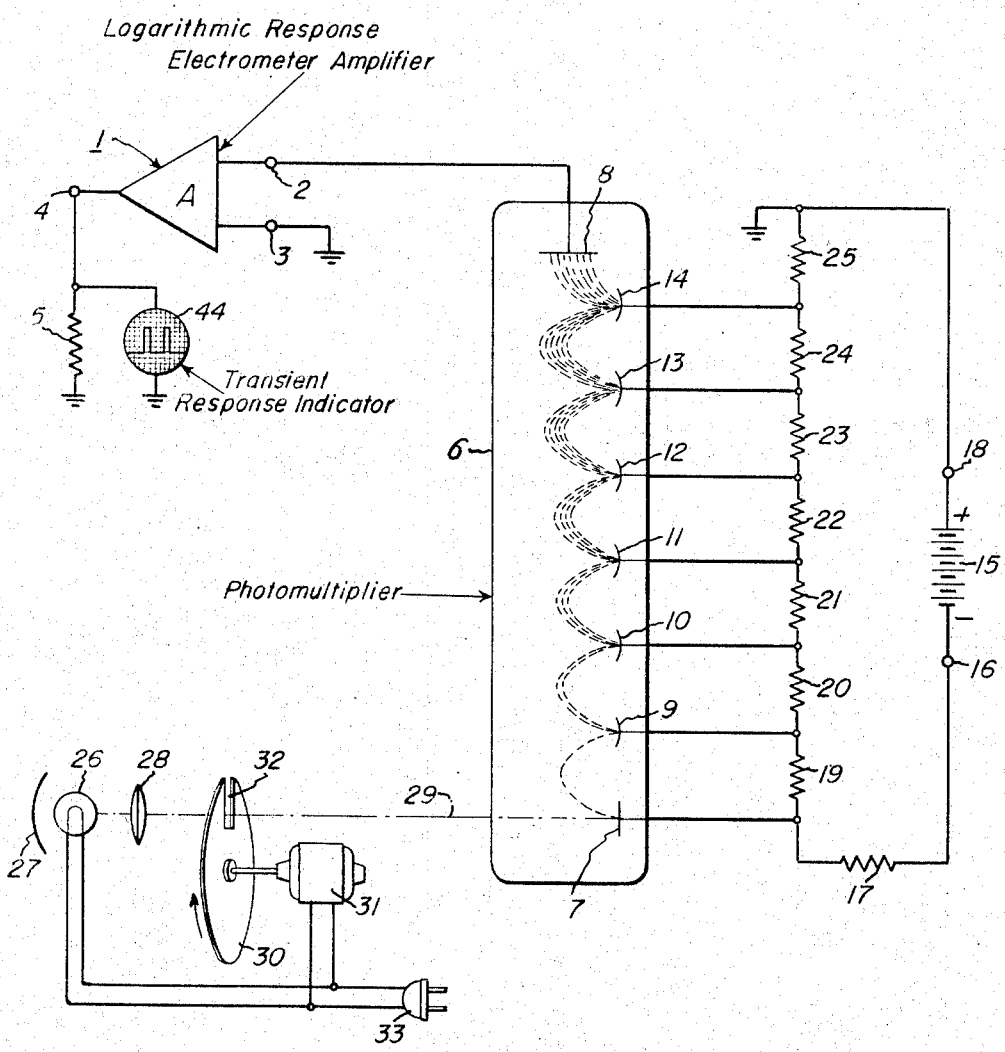
Inventor:
Robert L. Watters,
by John F. Ahern
His Attorney.

United States Patent Office 3,359,489
Patented Dec. 19, 1967

3,359,489
PHOTOMULTIPLIER APPARATUS FOR DETERMINING THE TRANSIENT RESPONSE OF LOGARITHMIC ELECTROMETERS
Robert L. Watters, Schenectady, N.Y., assignor to General Electric Company, a corporation of New York
Filed Nov. 2, 1964, Ser. No. 408,250
1 Claim. (Cl. 324—57)

ABSTRACT OF THE DISCLOSURE

A system for determining transient response of high input impedance logarithmic electrometer amplifiers wherein a large amplitude signal of rectangular waveform with a brief rise time and fall time is furnished to the amplifier from an intermittently actuated photomultiplier tube having a high output impedance. The amplifier response is monitored at an indicator responsive to the amplifier.

---

This invention relates generally to means for determining the response of electronic amplifiers and the like to transient input signals, and more particularly relates to methods and apparatus for testing the performance of logarithmic response electrometer amplifiers throughout their entire range of permissible input current magnitudes.

It is oftentimes desirable in many electronic systems to have knowledge of the transient response, or output behavior caused by rapid fluctuation of an input signal, in electronic amplifiers. For example, transient response is a significant factor in design considerations involving stability of systems in which such amplifiers are utilized. Also, the transient response may be critical in determining the time delay between a given stimulus and desired system reaction.

One expeditious manner of determining amplifier transient response is to apply a rectangular waveform of voltage or current to the amplifier input terminals and to monitor the output waveform by any of a plurality of means, oftentimes including an oscilloscope or other device featuring a cathode ray tube display. If the input signal possesses rapidly rising leading and trailing edges such as to closely approximate a rectangular waveform, observation of the output waveform enables those skilled in the art to readily ascertain amplifier transient response.

In linear amplifiers which approach minimum phase-shift networks, transient response is oftentimes computed by measuring the frequency response and relating frequency response to transient response by any of a plurality of ways including use of Fourier analysis. However, this is not readily accomplished in logarithmic amplifiers that are non-linear by definition and also oftentimes far from minimum phase-shift networks.

With the usual electronic amplifier, applying the requisite current or voltage pulse for determining transient response is readily accomplished. For example, in the simplest case a voltage pulse is applied by providing a battery or other substantially constant voltage source having an internal impedance at least one order of magnitude (factor of 10) less than the input impedance exhibited between the amplifier input terminals. The voltage source is then connected to the amplifier input terminals through a switching device capable of abruptly completing and interrupting the circuit so formed. On the other hand, when a current pulse is required a voltage having an equivalent series impedance at least one order of magnitude greater than the amplifier input impedance is connected to the amplifier input terminals through suitable switching means.

In sharp contrast to the ease with which rectangular waveform electric signals can be applied to conventional amplifiers, there has been no heretofore known means for adequately providing a rectangular waveform current pulse to the input of logarithmic response electrometer amplifiers. Accordingly, it has not been possible to take advantage of the aforementioned expeditious testing technique for determining the transient response of such amplifiers directly.

There exist two principal obstacles to providing a current pulse of suitable waveform to the logarithmic response electrometer amplifier. Namely the input impedance of such amplifiers is so high and the permissible range of currents so wide that the total performance can not be ascertained by usual methods without a source of unreasonably high voltage to provide the input signal. In a typical case, the equivalent input impedance is in the order of $10^{11}$ ohms. Thus, while a voltage source of, for example, 10 volts in series with an impedance of $10^{12}$ ohms would provide the requisite $10^{-11}$ amperes for low current testing, if the full range of the amplifier's typical response, that usually is at least six decades, were to be measured the voltage source would have to rise to at least $10^7$ volts to provide the requisite $10^{-5}$ amperes at the higher current end of the amplifier input spectrum. It is evident, that a testing apparatus requiring a voltage source of ten million volts is not only likely to be dangerous in many cases but also detracts from the economic advantages of the aforementioned simple testing technique.

The second problem arises primarily by virtue of the magnitude of inherent capacitance associated with the usual source of current pulses. Such capacitance must be minimized because it causes the applied current to decay exponentially by discharging through the extremely high equivalent input impedance of the amplifier, rather than abruptly falling to zero as desired. The effectiveness of the test as a true measure of transient response is partially destroyed by the presence of even slight capacitance exhibited by the pulse source.

It would be highly desirable to provide means for applying a current pulse to the input terminals of logarithmic response electrometer amplifiers. Preferably, the input current magnitude varies abruptly over a range of six or more decades in oder to permit the amplifier transient response to be ascertained quickly and in the manner in which the amplifier is actually intended to be used.

Accordingly, it is an object of my invention to provide economic and rapid means for determining transient response of logarithmic response electrometer amplifiers.

Another object of my invention is to provide a current source that is capable of applying a rectangular current pulse varying in magnitude over a range of at least six decades to the input of an amplifier having an input impedance in the order of $10^{11}$ ohms.

Still another object of my invention is to provide means for testing a logarithmic response electrometer amplifier in a manner simulating actual intended operating conditions for the amplifier.

Briefly, I have discovered that a photomultiplier light detecting device can be used as a suitable source of transient current pulses for use in determining the total frequency response of a logarithmic response electrometer amplifier. In accord with the present invention the cathode of the photomultiplier device is biased at a negative potential of appropriate magnitude relative to ground potential and the dynodes are biased at successively reduced negative potentials progressing from the cathode to the anode. The biasing means is not conductively coupled to the anode through the photomultiplier power supply such that the anode and last dynode are essentially only electron coupled. One terminal of the logarithmic amplifier to be tested is grounded and the other input terminal thereof is connected directly to the photomultiplier anode. A suitable transient response indicator, preferably a high quality oscilloscope, indicates the current waveforms at the output of the amplifier. Means are provided for periodically illuminating the cathode of the photomultiplier in order to provide corresponding pulses of current to the amplifier for testing purposes.

The features of my invention which are believed to be novel are set forth with particularity in the appended claim. My invention itself, however, both as to its organization and method of operation, together with further objects and advantages thereof, may best be understood by reference to the following description taken in connection with the accompanying drawing which shows, schematically, a transient response testing apparatus in accord with an illustrative embodiment of the invention.

An example of logarithmic electrometer amplifiers of the general type to which the present invention pertains is to be found explained in detail in my copending application entitled "Micro-Microammeter," Ser. No. 297,027, filed July 23, 1963, now Patent No. 3,320,532, issued May 16, 1967, and assigned to the assignee of the present invention. Briefly, amplifiers of this type include one or more amplifying stages providing a high gain, preferably in excess of 100, and ordinarily utilize an initial, or input, stage featuring a specially designed low voltage, high input impedance, vacuum discharge device. Such discharge devices are commercially available under a plurality of designations including the well-known 5886 type. Substantially all of the amplifier output signal energy is returned to the input thereof in the form of negative feedback. By providing a logarithmic element in the feedback path which changes in impedance logarithmically with changes in the magnitude of current therethrough, the feedback ratio of the amplifier is made to depend logarithmically upon the magnitude of the input signal to achieve an amplifier suitable for use over a wide range of input current exceeding six decades. Amplifier output voltage, or the magnitude of current feedback, is commonly utilized to provide an indication of the magnitude of the input current.

The logarithmic electrometer amplifier 1, illustrated in the drawing, includes input means shown schematically as terminals 2 and 3. One of terminals 2 and 3, terminal 3 in the drawing, is grounded or returned to the point of zero reference potential for the system. Amplifier output terminal 4 is connected to ground through a suitable resistance 5 or other current utilization means.

Photomultiplier 6 is a light detecting device having a photoemissive cathode electrode 7, an electron-collecting anode electrode 8, and a plurality of secondary electron emissive dynode electrodes 9–14 spaced at successive intervals between cathode 7 and anode 8. In operation, electrons emitted by cathode 7, under the influence of radiation of appropriate wavelength for the particular material from which cathode 7 is fabricated, are attracted to dynode 9 where an increased number of electrons are freed by secondary emission. The electron stream proceeds in this manner from dynode to dynode, increasing in strength, until the electrons are collected at anode 8. The particular number of dynodes used is not critical and various photomultipliers provide typically from 5 to 12 dynodes, with 9 being perhaps the most common. Also, oftentimes the dynodes are disposed alternately from one side to the other of the photomultiplier progressing from the cathode to the anode. In any case, the foregoing operation is in response to suitable illumination of the cathode.

Photomultiplier 6 is energized by a direct current power supply including a direct current voltage source 15, that can be a battery as illustrated schematically, having the terminal 16 of negative potential connected through a protective resistance 17 to cathode 7. Positive terminal 18 of source 15 is directly connected to ground, or the point of zero reference potential for the system.

The dynodes are biased at successively reduced negative potentials progressing from cathode 7 to anode 8. This can be accomplished as shown schematically by a resistance voltage divider connected from the junction of resistance 17 and cathode 7 to ground. As shown, individual resistances 19–25 are utilized in the voltage dividing network with resistance 19 connected from cathode 7 to dynode 9; resistance 20 connected from dynode 9 to dynode 10; resistance 21 connected from dynode 10 to dynode 11; and so forth. It will be understood that alternative arrangements can be utilized as, for example, adjustable taps on a single resistance. Of particular significance to the present invention is the fact that there is no conductive coupling through the biasing means between the last dynode 14 and anode 8. Anode 8 is conductively coupled only to amplifier input terminal 2. In this way, a requisite extremely high source impedance is achieved and undesired capacitance effects minimized.

Means for periodically illuminating cathode 7 is shown schematically as a source of electromagnetic radiation 6 that can in many cases be an incandescent filament lamp as illustrated schematically. The wavelength of the radiation supplied by lamp 26 is advantageously selected to match or at least include the wavelength of maximum sensitivity of the material from which photoemissive cathode 7 is fabricated. A reflector 27, that can be parabolic in shape, increases the efficiency of lamp 26 in illuminating cathode 7 as does a suitable collimating lens 28 disposed between lamp 26 and cathode 7. The light beam 29 between lamp 26 and cathode 7 is periodically switched on and off, by a suitable opaque disc 30 rotated by a motor 31 and having a light-transmissive slot 32 cut therein that is periodically positioned between lamp 26 and cathode 7 to permit light beam 29 to periodically illuminate cathode 7. Both lamp 26 and motor 31 are advantageously connected to a source of conventional power as by male plug 33. It will be understood that any of a vast number of equivalent means for periodically illuminating cathode 7 fall within the scope of the present invention. For example, I have on occasion found an ordinary 100 watt bulb and an electric fan positioned between the bulb and cathode 7 to be more than adequate for this purpose. Of course, more precise control of the source of illumination is advantageously provided in many cases also. In general, the source of periodic illumination becomes more suitable as the time interval during which the cathode is illuminated by the penumbra is reduced relative to the intervals of total darkness and illumination.

The transient response of amplifier 1 to current pulses supplied by the periodically illuminated photomultiplier 6 is most conveniently observed by connecting a visual indicator 44 to be responsive to the difference in potential between amplifier output terminal 4 and ground. The indicator conveniently takes the form of an oscilloscope, as illustrated schematically, although other means responsive to the transient output signal are advantageously used as a susbtitute therefor or in addition thereto in many cases. For example, when the testing is conducted after amplifier 1 has been assembled and during the final manufacture thereof, a low voltage threshold device (as a zener diode) is used to actuate a high frequency timer, or counter, and a higher voltage threshold device (that can also be a zener diode) terminates operation of the timer. The fewer counts recorded, the faster was the transient response. Alternatively, the output is integrated between voltage thresholds and signal strength detecting and amplifying means are made responsive to the magnitude of integrated output signal and are advantageously connected to actuate relays, or the like, which energize lights, buzzers, etc., to indicate satisfactory or unsatisfactory response. Similarly, automatic adjustment of amplifier 1 is effected by a suitable feedback network that provides adjustment of one or more parameters in amplifier 1 in accord with deviations of the character of the output signal from a predetermined standard.

In one particularly desirable embodiment of the invention as illustrated in the drawing, the following specific components were utilized:

Photomultiplier (9 dynodes) _____ Type 1P21
Dynode resistance _____ohms each__ 200K
Voltage source _____volts D.C__ 1500

While only certain preferred features of the invention have been shown by way of illustration, many modifications and changes will occur to those skilled in the art. It is, therefore, to be understood that the appended claim is intended to cover all such modifications and changes as fall within the true spirit and scope of this invention.

What I claim as new and desire to secure by Letters Patent of the United States is:

A transient current response measuring apparatus for determining the total transient performance of a logarithmic electrometer amplifier, having input and output means, over the full range of normal input current magnitude, said apparatus comprising:
- (a) a vacuum photomultiplier light detecting device having a photoemissive cathode electrode, an electron-collecting anode electrode, and a plurality of secondary electron emissive dynode electrodes spaced at successive intervals between said cathode and anode;
- (b) a direct current power supply conductively coupled to said cathode and dynode electrodes biasing said cathode electrode at a negative potential of given magnitude relative to ground potential and biasing said dynode electrodes at successively reduced negative potentials progressing from said cathode to said anode;
- (c) means conductively coupling said anode electrode only to the input means of said amplifier, said anode electrode being isolated from said power supply;
- (d) means intermittently illuminating said cathode electrode; and
- (e) transient response indicating means coupled to the output means of said amplifier.

References Cited
UNITED STATES PATENTS

| | | | |
|---|---|---|---|
| 2,444,560 | 7/1948 | Feldt et al. | 250—207 X |
| 2,474,098 | 6/1949 | Dimmick | 250—207 X |
| 2,717,316 | 9/1955 | Madey | 250—207 |
| 2,743,374 | 4/1956 | McCreary | 250—207 X |
| 2,764,697 | 9/1956 | Duke | 250—207 X |
| 2,850,645 | 9/1958 | Chilton et al. | 250—207 X |
| 2,854,583 | 9/1958 | Robinson | 250—207 X |
| 2,982,910 | 5/1961 | De Boisblanc | 324—57 |
| 3,272,984 | 9/1966 | Herzog et al. | 250—207 |

RUDOLPH V. ROLINEC, *Primary Examiner.*

E. E. KUBASIEWICZ, *Assistant Examiner.*